(12) United States Patent
Weingaertner et al.

(10) Patent No.: US 7,385,214 B2
(45) Date of Patent: Jun. 10, 2008

(54) SYSTEM AND METHOD FOR CORRECTING SYSTEMATIC ERROR OF, AND CALIBRATING FOR, TILT ANGLE OF SURFACE TOPOLOGY SENSOR HEAD HAVING PLURALITY OF DISTANCE SENSORS

(75) Inventors: Ingolf Weingaertner, Braunschweig (DE); Clemens Elster, Berlin (DE); Michael Schulz, Isenbuttel (DE)

(73) Assignee: Bundesrepublik Deutschland, vertreten durch das Bundesministerium für Wirtschaft und Technologie, dieses vertreten durch den Präsidenten der Physikalisch-Technischen Bundesanstalt, Braunschweig (DE)

( * ) Notice: Subject to any disclaimer, the term of this patent is extended or adjusted under 35 U.S.C. 154(b) by 0 days.

(21) Appl. No.: 11/571,330
(22) PCT Filed: Jul. 4, 2005
(86) PCT No.: PCT/DE2005/001189
§ 371 (c)(1), (2), (4) Date: Dec. 27, 2006
(87) PCT Pub. No.: WO2006/005311
PCT Pub. Date: Jan. 19, 2006

(65) Prior Publication Data
US 2007/0176130 A1 Aug. 2, 2007

(30) Foreign Application Priority Data
Jul. 6, 2004 (DE) .................... 10 2004 033 600

(51) Int. Cl.
*G01N 21/86* (2006.01)
*G01V 8/00* (2006.01)
(52) U.S. Cl. .................. 250/559.2; 250/559.37; 250/559.38; 73/1.75

(58) Field of Classification Search ............. 73/1.75, 73/1.77; 250/214 VT, 559.29, 559.37, 559.38, 250/559.39
See application file for complete search history.

(56) References Cited

U.S. PATENT DOCUMENTS
4,585,350 A  4/1986  Pryor
(Continued)

FOREIGN PATENT DOCUMENTS
DE  19926546  12/2000
(Continued)

OTHER PUBLICATIONS
Weingartner et al. System for Four Distance Sensors for High-Accuracy Measurement of Topography, Precision Engineering, Bd. 28, N. 2, pp. 164-170, Apr. 2004.

*Primary Examiner*—Georgia Epps
*Assistant Examiner*—Francis M LeGasse, Jr.
(74) *Attorney, Agent, or Firm*—Whitham Curtis Christofferson & Cook, PC

(57) ABSTRACT

The invention relates to a measuring arrangement comprising a sensor head (13) that can be displaced over a surface (11) at a distance therefrom in a scanning direction (R), a plurality of distance sensors which are suitable for distance measurement and are interspaced in the scanning direction in a fixed manner, a displacement device for displacing the sensor head (13) in such a way that points of the surface (11) are detected in successive scanning steps carried out by a plurality of distance sensors, and an evaluation device to which the output signals of the distance sensors are supplied. According to the invention, one such measuring arrangement is improved by an angle measuring device (14, 15) for determining an angle value of the sensor head (13) in relation to the scanning direction (R), and for forwarding said angle value to the evaluation device. In this way, systematic measuring errors can be eliminated for the reconstruction of a topography of the surface (11) in the scanning direction (R). Furthermore, the sensor head (13) can be calibrated by means of the measuring arrangement.

5 Claims, 4 Drawing Sheets

Figure 1:
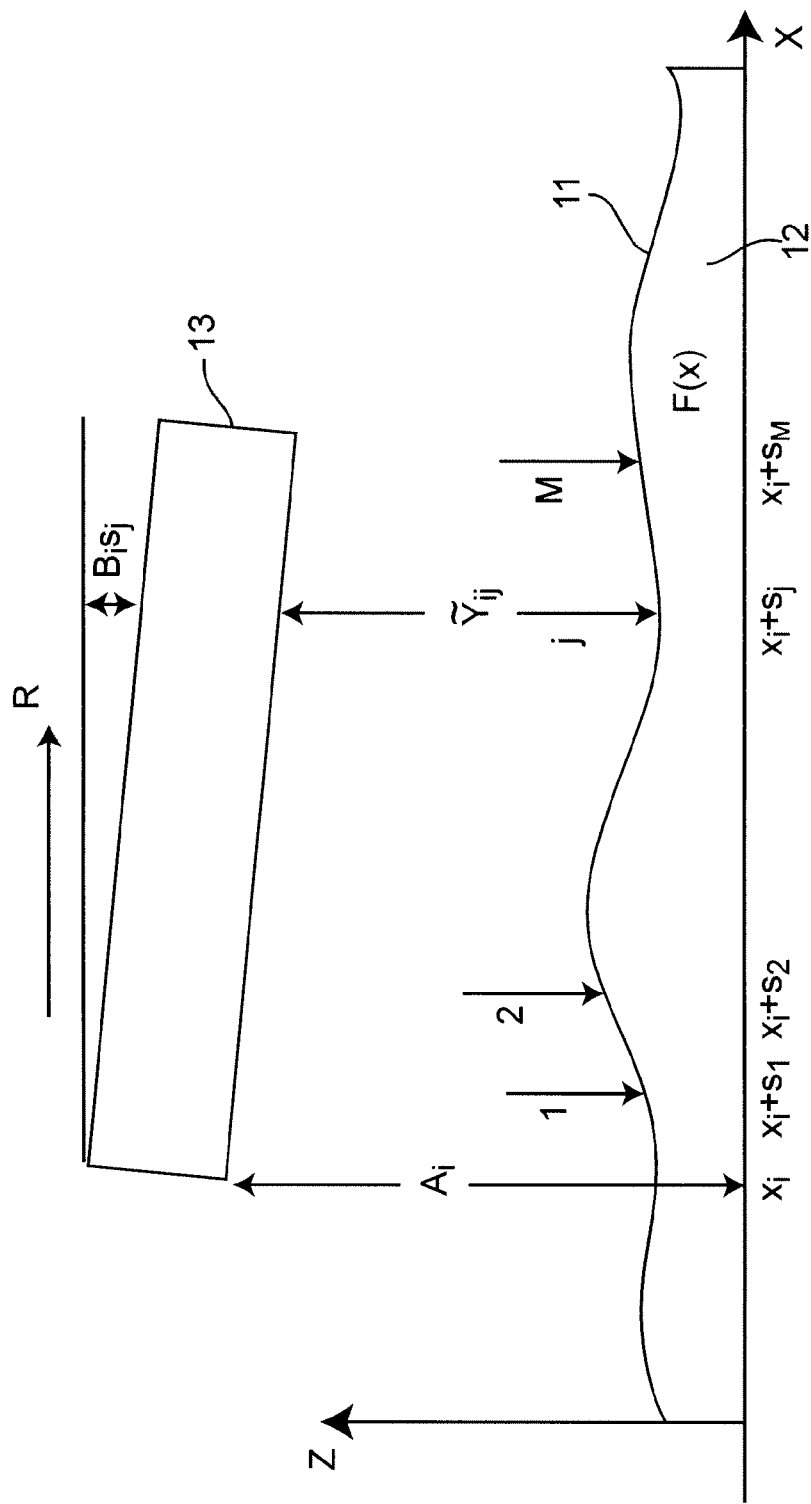

U.S. PATENT DOCUMENTS 5,106,183 A * 4/1992 Yoder, Jr. .................. 351/212

FOREIGN PATENT DOCUMENTS

| DE | 10161486 | 7/2003 |
| EP | 1 039 262 A2 | 9/2000 |
| EP | 1 391 684 A | 2/2004 |

* cited by examiner

SYSTEM AND METHOD FOR CORRECTING SYSTEMATIC ERROR OF, AND CALIBRATING FOR, TILT ANGLE OF SURFACE TOPOLOGY SENSOR HEAD HAVING PLURALITY OF DISTANCE SENSORS

Measuring arrangement comprising a plurality of distance sensors, calibrating device therefor, and method for determining the topography of a surface The invention relates to a measuring arrangement having a sensor head which can be moved over a surface, at a distance from the latter, in a scanning direction and has a plurality of distance sensors which are suitable for measuring the distance and are at a fixed distance from one another in the scanning direction, having a movement device for moving the sensor head in such scanning steps that points of the surfaces are detected in successive scanning steps by a plurality of sensors, and having an evaluation device which can be supplied with the output signals from the distance sensors.

The invention also relates to a calibrating device for calibrating such a measuring arrangement.

The invention also relates to a method for determining the topography of a surface by scanning the surface in a scanning direction using a sensor head which has a multiplicity of $M (M \geq 3)$ distance sensors which are at a distance from one another in the scanning direction, determining output signals from the distance sensors in prescribed scanning steps and evaluating the output signals in order to reconstruct the topography along the scanning direction.

In order to determine the topography of a surface, it is known practice to use a plurality of distance sensors which are arranged in a fixed manner in a sensor head at prescribed distances from one another in the scanning direction (cf. Weingärtner, Elster "System of Four Distance Sensors for High-Accuracy Measurement of Topography" prec. Eng. 2004, 28: 164-170).

If the distance between the distance sensors in the sensor head is a multiple of the scanning steps, the points of the surface are detected by the different sensors in the sensor head. On account of the fact that the surface is detected using a multiplicity of sensors, it is possible to determine the topography of a surface without presupposing the precise distance between the sensor head and the surface and a precise alignment of the sensor head with respect to the surface. On account of the plurality of sensors which are arranged in the scanning direction, it is possible to determine the angular position of the sensors with respect to the surface and to concomitantly incorporate it in the reconstruction of the topography. It is therefore possible to reproduce the topography whilst eliminating positional and angular errors of the sensor head on account of the use of the plurality of sensors.

The present invention is based on the knowledge that although the positional and angular errors can be eliminated using the known methods if, for example, four distance sensors which are coupled to one another are used in a sensor head and their output signals are used to form differential signals, for example, certain systematic errors cannot, in principle, be mathematically eliminated—irrespective of the number of distance sensors—and result in unclear mathematical solutions for reconstructing the topography. In mathematical terms, they are quadratic errors terms which result in the ambiguities—and thus fundamental error—in the evaluation of the distance signals.

The present invention is based on the object of specifying a measuring system which can be used to unambiguously determine a topography of a surface even taking into account systematic errors.

In order to achieve this object, a measuring arrangement of the type mentioned initially is characterized, according to the invention, by an angle measurement device for determining an angle value of the sensor head relative to the scanning direction and for forwarding the angle value to the evaluation device.

In order to achieve the object, the method of the type mentioned initially is also characterized in that the angle of the sensor head relative to the scanning direction is determined, and the measured angle value is incorporated in the evaluation for eliminating systematic measurement errors.

In a further aspect of the invention, a calibrating device for calibrating the measuring arrangement according to the invention is characterized by a holder for the sensor head, which holder is arranged relative to a planar surface and can be tilted in the direction of the arrangement of the sensors (scanning direction), by an angle measurement device for the angle of the sensor head relative to the scanning direction, and by a comparison device for comparing an item of angle information obtained from the measured signals of the distance sensors with the angle value measured by the angle measurement device.

It is possible, in a surprisingly simple manner, to clearly reconstruct the topography of a surface measured using a sensor head having a plurality of distance sensors if the angle of the sensor head relative to the scanning direction is determined for each scanning step. This makes it possible to eliminate the ambiguity, which otherwise exists, in the evaluation of the signals from the distance sensors, as will also be explained in more detail below.

The number of distance sensors in the sensor head is $\geq 3$ and preferably $\geq 4$. In a more preferred embodiment of the invention, use is made of sensor heads having considerably more distance sensors in the scanning direction, for example ten or more distance sensors. It is also possible to use sensor heads which form a two-dimensional array of distance sensors, the array having, in terms of order of magnitude, one hundred distance sensors in the scanning direction and forming one hundred rows of the one hundred distance sensors, said rows being arranged next to one another, with the result that a matrix of 100×100 distance sensors, in terms of order of magnitude, is formed. In this case, it is possible to evaluate the rows of distance sensors, which are each in the scanning direction, in a parallel manner, with the result that it becomes possible to considerably accelerate the gauging of a surface.

The practice of gauging a surface according to the invention is suitable for essentially planar surfaces, in which the scanning direction is on a rectilinear path, as well as for spherically curved surfaces in which the scanning movement is effected on a correspondingly curved path.

As will also be explained in more detail below, the system according to the invention involves providing a measured angle value for the sensor head and introducing it into the evaluation mathematics. The background to this is that the distance sensors which are in the scanning direction likewise contain information regarding the angular position of the sensor head. This opens up a possibility of calibrating the sensor head of the measuring arrangement according to the invention by introducing the sensor head, in a calibrating device, into a holder which can be tilted in the direction of the arrangement of the sensors (that is to say in the scanning direction when the measuring arrangement is in use), an angle measurement device again being provided for the angle of the sensor head relative to the scanning direction. Such an angle measurement device, as can be formed by an autocollimation telescope, for example, can be calibrated with a very high level of accuracy, with the result that it is possible to measure the angle in a highly accurate manner, for example by fitting a mirror to the sensor head for the reflection of a measuring beam which is required by the autocollimation telescope. In order to calibrate the sensor head, angle information determined by the evaluation device from the output signals from the distance sensors can then be compared with the measured angle values for calibration.

Figure 2:
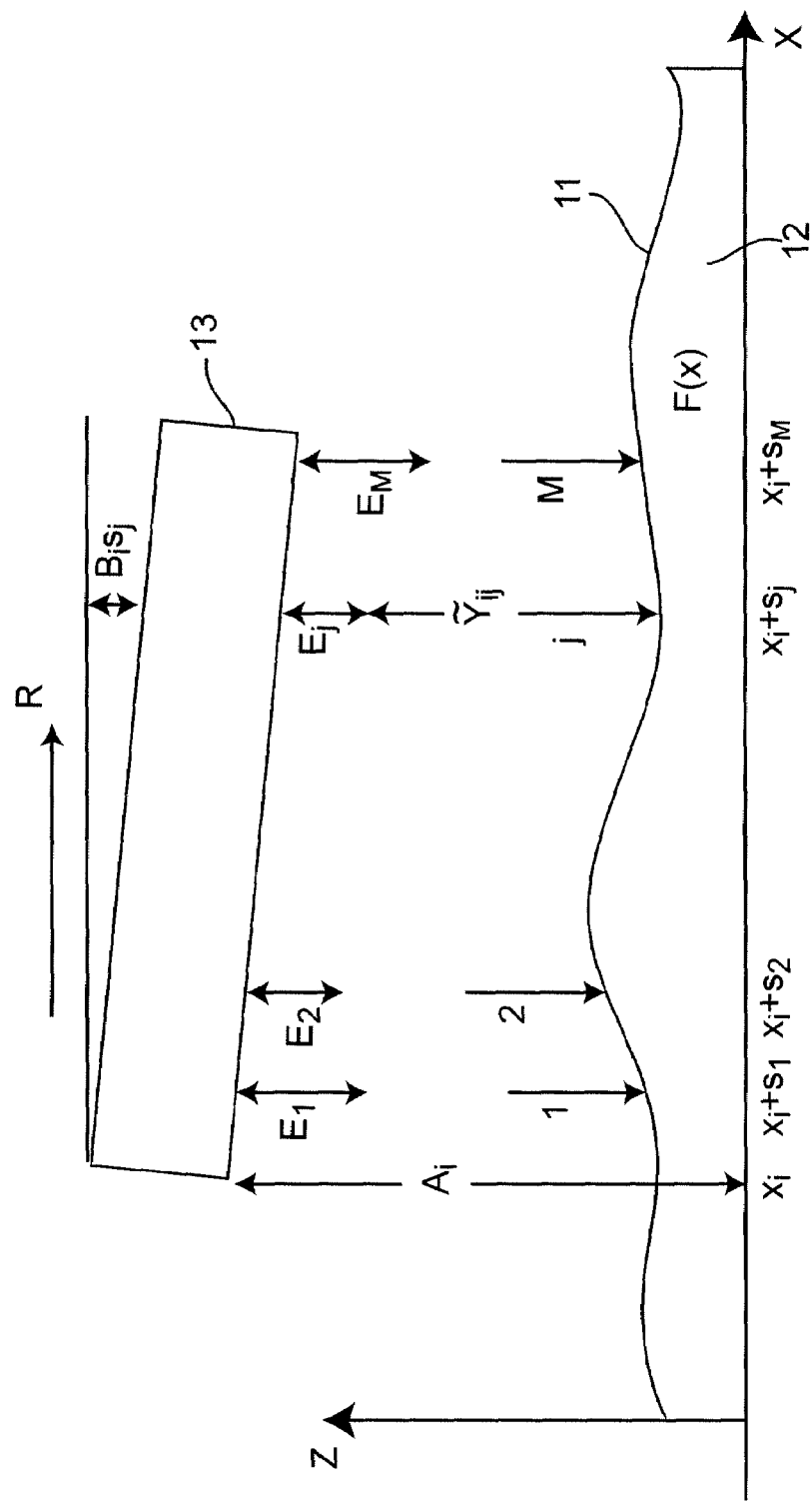
Figure 3:
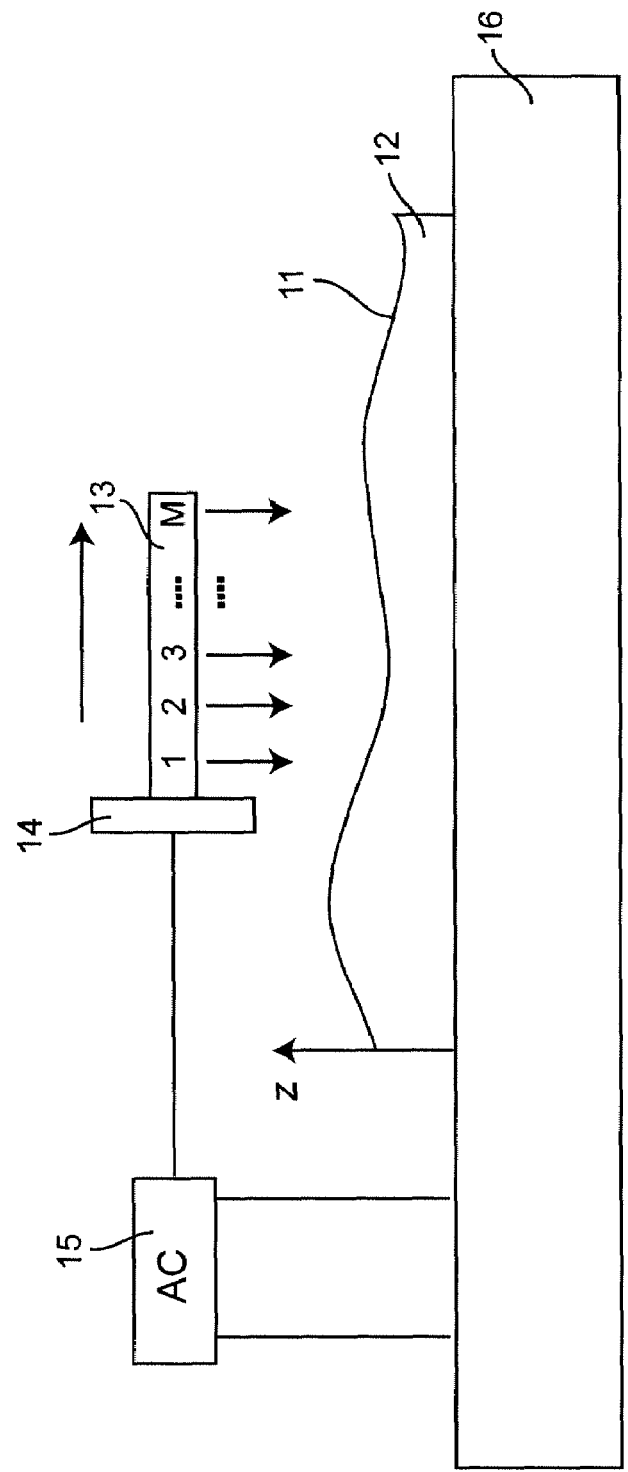
Figure 4:
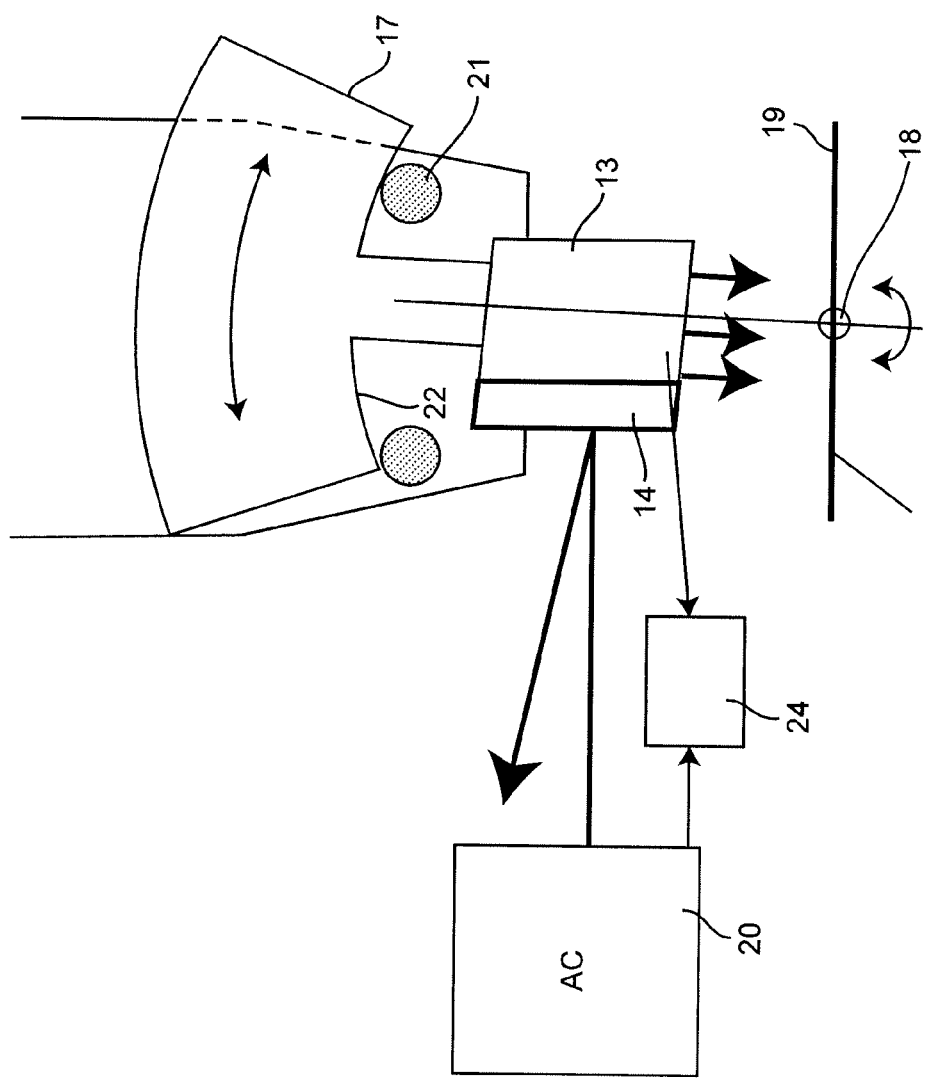

The invention shall be explained in more detail below with reference to the accompanying drawings, in which:

FIG. 1 shows a diagrammatic illustration of a sensor head which is guided over an unknown surface in the scanning direction and has a plurality of distance sensors, taking into account conventional parameters, FIG. 2 shows an illustration according to FIG. 1 taking into account additional systematic error values, FIG. 3 shows a diagrammatic illustration of an arrangement according to the invention having an angle measurement device for the angle of the sensor head relative to the scanning direction, FIG. 4 shows a diagrammatic illustration of a calibrating device for a sensor head according to the invention.

FIGS. 1 to 3 illustrate a surface 11 of an object 12 which has irregularities in the microscopic range. The topography of the surface formed from said irregularities is intended to be determined using a sensor head 13 having a number 1 . . . M of distance sensors which in a longitudinal direction of the sensor head 13 which corresponds to a scanning direction indicated by the arrow R.

The distance sensors are arranged in the sensor head 13 at defined distances in the scanning direction R which corresponds to the X direction of a coordinate system in FIG. 1.

In order to determine the topography of the surface 11, the sensor head 13 is moved over the surface 11, at a distance from the latter, in the scanning direction, and the measured values $\tilde{Y}_{ij}$ generated by the distance sensors 1 . . . M are determined in scanning steps $\Delta x$ and are supplied to an evaluation device.

The distance between adjacent sensors can be selected in such a manner that it is a multiple of the step size $\Delta x$ of a scanning step. The following then applies to the position of the jth sensor at the ith scanning position of the sensor head $$x_{ij} = x_i + s_j \Delta x = (i + s_j) \Delta x,$$

where $0 = s_1 < s_2 < \ldots < s_M$ for $s_j$.

FIG. 1 reveals the influences of errors on the measured values $\tilde{Y}_{ij}$. The distance $A_i$ between the sensor head 13 and a reference line (in this case X coordinate), that is to say the offset between the topography 11 and the reference line, is unknown. An angular position of the sensor head 13 relative to the reference line is also unknown, in which case it can be assumed that the angular deviations can be kept small for precision measurements. In this case, the sensor head 13 has an error $B_i s_j$ for the measured value $\tilde{Y}_{ij}$ on account of the angular position. The following thus applies $$\tilde{Y}_{ij} = -F_{i+s_j} + A_i + B_i s_j, \quad j=1, \ldots, M, \quad i=1, \ldots, N-s_M \quad (1)$$

In addition to the topography 11, the angle values $B_i$ and the offsets $A_i$ are unknown in this case. The use of a plurality of distance sensors in the sensor head 13 makes it possible, as is known, to eliminate the offset values $A_i$ and the angular errors $B_i$, with the result that it is possible to reconstruct the topography 11 in a manner free of these errors.

However, systematic errors of the arrangement are not taken into account in this consideration. Such systematic errors which are effective for all measurements are produced by differences in the distance sensors which may occur in the same plane both in the internal design and in the arrangement. Miniature interferometers which, on account of their internal design, have deviations that result in the systematic errors are preferably used as distance sensors.

If the systematic errors $E_1 \ldots E_M$ are taken into account, as is indicated in FIG. 2, the result is as follows $$Y_{ij} = \tilde{Y}_{ij} - E_j = -F_{i+s_j} + A_i + B_i s_j - E_j, \quad j=1, \ldots, M, \quad i=1, \ldots, N-s_M \quad (2)$$

where $Y_{ij}$ indicates the distance of the jth sensor at the ith scanning position, corrected by the unknown systematic error $E_j$.

It has been found that, irrespective of the number M of distance sensors, a clear mathematical solution is not possible. On account of dependencies between the values on the right-hand side of (2), different solutions result if the associated topographies $F_1, \ldots, F_N$ differ by square functions.

Surprisingly, the ambiguity is eliminated by means of an additional angle measurement for the sensor head 13. To this end, the sensor head 13 is fixedly connected to a mirror 14 that is situated in the beam path of an angle measurement device 15 which is in the form of an autocollimation telescope (autocollimator AC). The angle measuring arrangement is used to measure the angle values $B_i$ for each scanning step i. The measured values $\beta_i$ result as $$\beta_i = B_i + B, \quad i=1, \ldots, N-s_M \quad (3)$$

where the unknown B specifies a constant difference between the angle determined by the sensor head and the measured angle. This additional measurement makes it possible to eliminate the ambiguity in the equation (2) for practical purposes. In practice, any remaining ambiguity is insignificant as long as the unknown topography is essentially smooth and planar.

The topography is reconstructed in a manner known per se using the least square deviation method.

The angle measurement device 15 is preferably fixedly connected to a base structure 16 on which the guide for displacing the sensor head 13 and the object 12 to be examined are also fixedly mounted. In order to calibrate the sensor head 13, the latter is connected, in the arrangement according to figure 4, to a holder 17 which can be used to tilt the sensor head 13 about an axis of rotation 18 which us preferable in a smooth surface 19. The distance sensors 13 can be used by an evaluation device 24 to determine the tilting angle of the sensor head relative to the surface 19. This determination is compared by the evaluation device 24 with an angle measurement of an angle measurement device 20, which is effected t the mirror 14 in the same manner as the angle measurement using the angle measuring arrangement 15.

In order to tilt the sensor head 13, the holder 17 is of approximately T-shaped design and runs, with two lateral attachments, on guide rollers 21. The underside of the lateral attachments is in the form of an arc of a circle 22 whose circle midpoint is in the axis of rotation 18.

It may be necessary to calibrate the sensor head 13 in order, for example, to compensate for inaccuracies in the determination of lateral coordinates when determining a gradient of the topography 11, as occur, for example, when using interferometers as distance sensors.

The invention claimed is:

1. A surface measuring arrangement comprising:
    a sensor head movable over a surface in a scanning direction,
    a device for measuring an angle of the sensor head relative to the scanning direction comprising an auto-collimation telescope wherein a mirror, that is fixedly connected to the sensor head, or another highly accurate angle measurement device, is positioned in the beam oath of the auto-collimation telescope and wherein the mirror and auto-collimation telescope are used to output an angle of the sensor head,
    a plurality of distance sensors, arranged on the sensor head at a fixed spacing from one another in the scanning direction, for detecting the surface and outputting respective distance sensor signals for measuring the distance from the respective distance sensors to the surface
    a movement device for moving the sensor head in successive scanning,
    an evaluation device for receiving the distance sensor signals and the sensor head angle signal, and for detecting a topology of the surface based on the distance sensor signals and the sensor head angle signal.

2. The measuring arrangement of claim 1, wherein the evaluation device is arranged for reconstructing a topography of the surface in the scanning direction, the reconstructing including eliminating systematic quadratic measurement errors in the topography by incorporating the measured angle value.

3. A calibrating device for calibrating a measuring arrangement having a sensor head movable in a scanning direction above a smooth surface, a plurality of distance sensors arranged on the sensor head in an arrangement direction for detecting the surface and outputting corresponding distance sensor signals, and having an evaluation device for generating an angle information value, based on the distance sensor signals, indicative of an angle of the sensor head relative to the smooth surface comprising:
    a holder for holding the sensor head at an orientation selectively tilted at an angle about an axis of rotation relative to the scanning, and
    a device for measuring an angle of the sensor head relative to the scanning direction comprising an auto-collimation telescope wherein a mirror, that is fixedly connected to the sensor head, or another highly accurate angle measurement device, is positioned in the beam oath of the auto-collimation telescope and wherein the mirror and auto-collimation telescope are used to output an angle of the sensor head,
    wherein the evaluating device is arranged for comparing the angle information value obtained from the distance sensor signals of the distance sensors against the measured angle signal from the angle measurement device.

4. The calibrating device of claim 3, wherein the axis of rotation for the tilting movement of the sensor head is parallel to the smooth surface.

5. A method for determining the topography of a surface, comprising
    Scanning the surface in a scanning direction using a sensor head having a plurality of M distance sensors and a device for measuring an angle of the sensor head relative to the scanning direction comprising an auto-collimation telescope wherein a mirror, that is fixedly connected to the sensor head, or another highly accurate angle measurement device, is positioned in the beam path of the auto-collimation telescope and wherein the mirror and auto-collimation telescope are used to output an angle of the sensor head,
    wherein each scanning including measuring an angle of the sensor head and generating a corresponding angle measurement signal, moving the sensor head in the scanning direction and generating from the plurality of distance sensors a plurality of output signals,
    evaluating, based on the output signals from the distance sensors from prescribed repetitions of the scanning steps the topography along the scanning direction,
    wherein the measuring an angle of the sensor head relative to the scanning direction is performed at each scanning step, and
    wherein the evaluating includes eliminating systematic quadratic measurement errors, the eliminating based on the angle measurement signal.

* * * * *